(12) United States Patent
Hill

(10) Patent No.: US 7,608,782 B2
(45) Date of Patent: *Oct. 27, 2009

(54) CLIP

(76) Inventor: Douglas C. Hill, 6244 Eastland Rd., Brookpark, OH (US) 44142

( * ) Notice: Subject to any disclaimer, the term of this patent is extended or adjusted under 35 U.S.C. 154(b) by 0 days.

This patent is subject to a terminal disclaimer.

(21) Appl. No.: 12/069,780

(22) Filed: Feb. 13, 2008

(65) Prior Publication Data

US 2008/0203247 A1    Aug. 28, 2008

Related U.S. Application Data

(63) Continuation-in-part of application No. 11/450,119, filed on Jun. 9, 2006, now Pat. No. 7,456,361.

(60) Provisional application No. 60/688,954, filed on Jun. 9, 2005, provisional application No. 60/759,715, filed on Jan. 18, 2006.

(51) Int. Cl.
*F16L 3/08* (2006.01)
(52) U.S. Cl. ..................... 174/84 C; 248/74.2
(58) Field of Classification Search ............... 174/84 C; 248/68.1, 74.1, 74.3; D8/354
See application file for complete search history.

(56) References Cited

U.S. PATENT DOCUMENTS

| | | |
|---|---|---|
| 810,004 A | 1/1906 | Tabler |
| 886,241 A | 4/1908 | Norton |
| 1,818,625 A | 8/1931 | Hunter |
| 2,375,513 A | 5/1945 | Bach |
| 2,469,451 A | 5/1949 | Burrus |
| 2,541,828 A | 2/1951 | Peck |
| 2,588,251 A | 3/1952 | Kost |
| 2,868,489 A | 1/1959 | Calcut |
| 3,154,281 A | 10/1964 | Frank |
| 3,252,677 A | 5/1966 | Raymond |
| 3,370,815 A | 2/1968 | Opperthauser |
| 3,471,987 A | 10/1969 | Yelsma |
| 3,602,956 A | 9/1971 | Eddens et al. |
| 3,894,706 A | 7/1975 | Mizusawa |
| 3,905,570 A | 9/1975 | Nieuwveld |
| 4,119,285 A | 10/1978 | Bisping et al. |
| D257,950 S | 1/1981 | Van Meter, Jr. et al. |
| D264,682 S * | 6/1982 | Van Doren ............... D8/354 |
| 4,397,438 A * | 8/1983 | Chapman ............... 248/229.16 |
| 4,669,156 A | 6/1987 | Guido et al. |
| 4,796,848 A | 1/1989 | Lanz |
| 4,824,057 A | 4/1989 | Suprono |
| 4,881,705 A | 11/1989 | Kraus |
| 4,903,629 A | 2/1990 | Maudlin et al. |
| 4,903,920 A | 2/1990 | Merritt |
| 4,934,635 A | 6/1990 | Sherman |
| 4,991,801 A | 2/1991 | Trumbull |

(Continued)

OTHER PUBLICATIONS

Office Action issued Feb. 25, 2008 in connection with U.S. Appl. No. 11/450,119.

*Primary Examiner*—Chau N Nguyen
(74) *Attorney, Agent, or Firm*—Fay Sharpe LLP

(57) ABSTRACT

A device for securing a conduit to a structural object. The device including a clip having a longitudinally extending clip body with a conduit receiving cavity extending in the longitudinal direction and about a cavity axis with a longitudinally extending conduit receiving slot. The device further including a panel strap securable to the structural object.

36 Claims, 7 Drawing Sheets

U.S. PATENT DOCUMENTS

| | | |
|---|---|---|
| 5,018,260 A | 5/1991 | Ziu |
| 5,028,020 A | 7/1991 | Sundholm |
| 5,090,645 A | 2/1992 | Zuercher |
| 5,118,215 A | 6/1992 | Freier |
| D333,256 S | 2/1993 | Newcomer et al. |
| D333,257 S | 2/1993 | Newcomer et al. |
| 5,184,792 A | 2/1993 | Bernhard et al. |
| 5,188,318 A | 2/1993 | Newcomer et al. |
| 5,189,719 A | 2/1993 | Coleman et al. |
| 5,384,936 A | 1/1995 | Van Walraven |
| 5,463,189 A | 10/1995 | Deneke et al. |
| 5,626,316 A | 5/1997 | Smigel et al. |
| 5,639,049 A | 6/1997 | Jennings et al. |
| 5,795,335 A * | 8/1998 | Zinreich ............... 604/174 |
| 5,967,468 A | 10/1999 | Veghte et al. |
| 6,109,569 A | 8/2000 | Sakaida |
| 6,152,412 A | 11/2000 | Basickes et al. |
| D438,781 S | 3/2001 | Leach |
| 6,216,987 B1 | 4/2001 | Fukuo |
| 6,390,421 B1 | 5/2002 | Rudd |
| 6,444,907 B1 | 9/2002 | Kiely |
| 6,486,395 B1 | 11/2002 | Temblador |
| 6,644,892 B2 | 11/2003 | Nishiwaki et al. |
| RE38,345 E | 12/2003 | Falciglia et al. |
| 6,682,025 B2 | 1/2004 | Turner et al. |
| 6,825,418 B1 | 11/2004 | Dollins et al. |
| 6,932,223 B1 * | 8/2005 | Lee et al. ............... 211/70.6 |
| 7,131,170 B2 | 11/2006 | Weaver |
| 7,456,361 B2 * | 11/2008 | Hill ..................... 174/84 C |
| 2003/0164430 A1 | 9/2003 | Walraven |
| 2004/0004164 A1 | 1/2004 | Chen |
| 2005/0011996 A1 | 1/2005 | Geater |
| 2006/0006292 A1 | 1/2006 | Kleeb et al. |

* cited by examiner

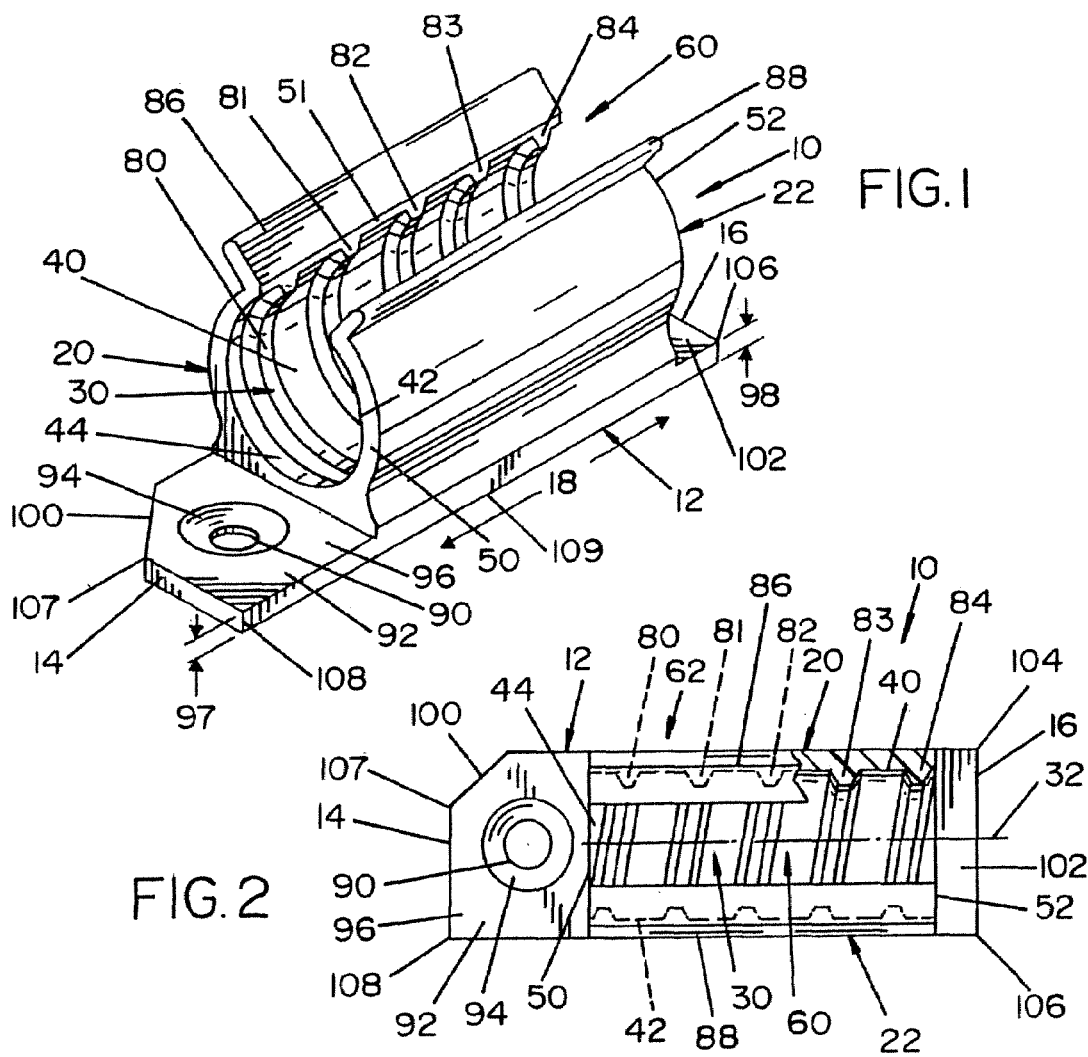
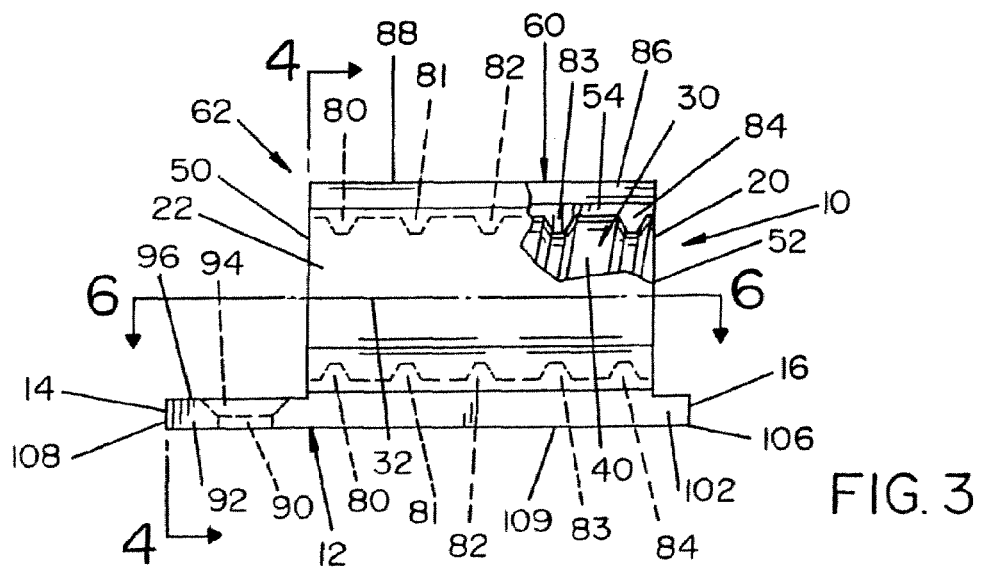

CLIP

This application is a continuation-in-part of U.S. patent application Ser. No. 11/450,119 filed on Jun. 9, 2006 now U.S. Pat. No. 7,456,361 which application claims priority in U.S. provisional application Ser. No. 60/688,954, filed Jun. 9, 2005, entitled "CLIP" and U.S. provisional application Ser. No. 60/759,715, filed Jan. 18, 2006, all of which are incorporated by reference herein.

The invention of this application relates to the construction industry and the mounting of electrical wiring and other conduits to a structure. More particularly, to a clip system that can be used in connection with flexible armored electrical cable of all varieties (including or MC cable) and other conduits herein after all referred to as conduits.

INCORPORATION BY REFERENCE

The present invention relates to electrical wiring other conduits and, more particularly, for a clip system for securing these conduit to a structural component of a facility. Coleman et al U.S. Pat. No. 5,189,719 discloses a rectangular flexible armored cable; Falciglia et al RE38,345 discloses around flexible armored cable; and Dollins et al. U.S. Pat. No. 6,825,418 discloses a coded flexible armored cable. These patents are incorporated by reference herein as background information illustrating flexible armored cables including MC style cables. Temblador U.S. Pat. No. 6,486,395 discloses a flexible armored cable with a special wiring configuration to illustrate that the invention of this application can be used in connection with all flexible armored cable, regardless of the wire gauge and/or wire configuration in the flexible armored cable, and is also incorporated by reference herein as background information.

BACKGROUND OF THE INVENTION

The present invention is particularly applicable for use in connection with commercial installation of electrical wiring and, thus, will be discussed with respect to commercial applications. However, the invention of this application is not to be limited to commercial applications and/or wiring. In this respect, many commercial applications require some form of protection of the electrical wiring in a facility. For many years, electricians ran wire through rigid pipes. Now, with the development of flexible armored cable, rigid pipes are not needed. As can be appreciated, this eliminates the step of hanging rigid pipe and pulling the wire through the pipe. Further, since the armor is flexible, it can be easily manipulated around obstacles without jeopardizing the insulated qualities of the wire.

It is, of course, also well known that the electrical wiring in any facility must be insulated and secured to the structure in such a way that the electrical current is controlled and prevented from harming people and property. That is why virtually all electrical wiring sold includes some form of insulation. This can include the thin insulation surrounding the wire core and an outer layer of insulation surrounding the wire insulation. In some cases, the outer layer is made from a material similar to the wire insulation, such as a polymeric material. The wiring can also include a hard outer layer to further protect the wire. For the invention of this application, the wire includes a flexible armored outer layer to protect the wire. While the flexible armored layer, as is described in the above referenced patents, is typically made from a metallic material in today's electrical industry, it should be appreciated that the invention of this application could also be used in connection with non-metal flexible armored cables and other cables that could be used or will be used in the electrical industry.

While it has been found that flexible armored cables provide an efficient and effective means for wiring a facility with a protected electrical wire, the flexible armored cable must still be secured to the structure of the facility to be wired. This includes mounting the flexible armored cable to the studs in the facility, which could be wooden studs, but are typically metal studs in today's commercial construction projects. The mounting also includes mounting the flexible armored cable to ceiling structures and other structures. As can be appreciated, especially with commercial construction, the ceiling can be very high, wherein it is best to utilize mechanisms that are quick and easy to use, to minimize the time and expense of wiring a facility. Further, as can also be appreciated, mounting structures that only require one hand to use can be very beneficial since the other hand can be utilized to guide the cable and/or to maintain one's balance. Likewise, it is also time consuming and costly to install other forms of conduit.

Prior art clips have been created to help secure conduit to the facility; however, these clips are difficult to use, require tools and both hands. In addition, these prior art clips are costly.

SUMMARY OF THE INVENTION

In accordance with the present invention, provided is a clips system including a clip and/or a panel strap for flexible armored cable and other conduits. More particularly, provided is a clip that is easily securable to a building's structural components and is configured to allow the conduit to be easily and quickly secured to the clip.

In this respect, a clip according to the present invention is for use with a conduit to secure the conduit to a structural object. The conduit has a central conduit axis and an outer armored layer extending about the conduit axis wherein the outer layer is formed from alternating crowns and troughs helically wound about the conduit axis such that the crowns and troughs are not perpendicular to the conduit axis. The clip, according to one aspect of the present invention, includes a longitudinally extending base with a bottom portion for engaging the structural object. The clip further includes a first end and a second end longitudinally spaced from the first end and a first side wall extending upwardly from the base between the first and second base ends. The first side wall includes a first inwardly extending surface forming a first portion of a longitudinally extending conduit cavity wherein the first portion has a first upper edge. The clip further includes a second side wall extending upwardly from the base between the first and second base ends and has a second inwardly extending surface forming a second portion of the conduit cavity. The second portion faces the first portion and has a second upper edge spaced from the first upper edge thereby forming a longitudinally extending entry gap for receiving the conduit that is opposite to the base. These first and second side walls are also bendable between a relaxed condition when the conduit is not positioned in the cavity and an engaged condition when the conduit is positioned in the cavity such that the conduit extends longitudinally through the cavity. The conduit cavity has a generally oval cross-sectional configuration when in the relaxed condition with a height between the bottom extent of the cavity and the entry gap and a width between the first and second inwardly extending surfaces wherein the height is greater than the width when in the relaxed condition. The clip can further including at least one transverse rib in the cavity configured to at least partially enter a trough in the conduit when the clip is in the engaged condition.

In accordance with another aspect of the present invention, provided is a clip for securing a conduit to a structural object which includes a longitudinally extending clip body having a generally C-shaped wire receiving cavity extending in the longitudinal direction and about the cavity axis with a longitudinally extending conduit receiving slot. The wire receiving cavity has a plurality of transverse ribs that are parallel to one another and each of these ribs has a first end and a second end that are circumferentially space about the cavity axis and which are longitudinally spaced. These ribs are configured to extend into a portion of a trough in the conduit.

BRIEF DESCRIPTION OF THE DRAWINGS

The foregoing and more, will, in part, be obvious and, in part, be pointed out more fully hereinafter, in connection with a written description of preferred embodiments of the present invention illustrated in the accompanying drawings in which:

FIG. 1 is a perspective view of a clip in accordance with an aspect of the present invention;

FIG. 2 is a top, partially sectioned, view of the clip shown in FIG. 1;

FIG. 3 is a side, partially sectioned, view of the clip shown in FIG. 1;

DESCRIPTION OF PREFERRED EMBODIMENTS

Figure 4:
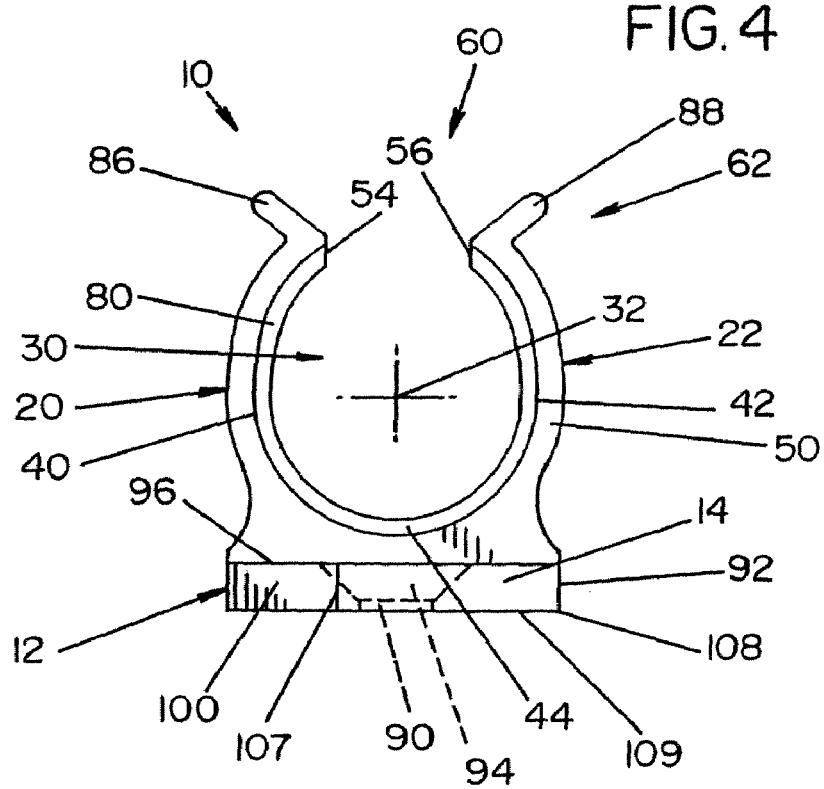
FIG. 4 is a front view taken from lines 4-4 in FIG. 3.

Referring now in greater detail to the drawings, wherein the showings are for the purpose of illustrating preferred embodiments of the invention only, and not for the purpose of limiting the invention FIGS. 1-7 show a clip 10 having a base portion 12 extending between an end 14 and an end 16 that together define longitudinal direction 18. Clip 10 further includes side walls 20 and 22 that also extend in the longitudinal direction.

Clip 10 further includes a conduit receiving cavity 30 that is oval or C-shaped which can extend from end 14 to end 16, but can be shorter. Cavity 30 is shaped to receive a section of an armored conduit or MC-cable C to secure conduit C to the clip such that the clip can be used to support the conduit on a structural object such as on a stud S. Cavity 30 extends circumferentially about a cavity axis 32. Cavity 30 is formed at least in part by inner surfaces 40 and 42 of walls 20 and 22, respectively. Inner surface portions 40 & 42 can be joined to one another or can be connected by a base surface portion 44 near base 12. Further, cavity 12 can be a smooth arcuate cavity or can be polygonal such that it is still generally C-shaped. As can be appreciated, and for example only, surface portion 40 or 42 could be formed by a plurality of non-parallel flat surface portions producing a polygonal cross-sectional configuration or could be formed by a unified arcuate surface without detracting from the invention of this application.

Again, cavity 30 extends longitudinally in direction 18 and is shown to extend between cavity ends 50 and 52. Cavity 30 extends circumferentially between top edges 54 and 56. While cavity 30 is shown to be continuous, cavity 30 does not need to be continuous and could include gaps, mounting arrangements etc. including, but not limited to, a central mounting hole (not shown) in the cavity to secure the clip to a structural object which will be discussed in greater detail below.

Figure 5:
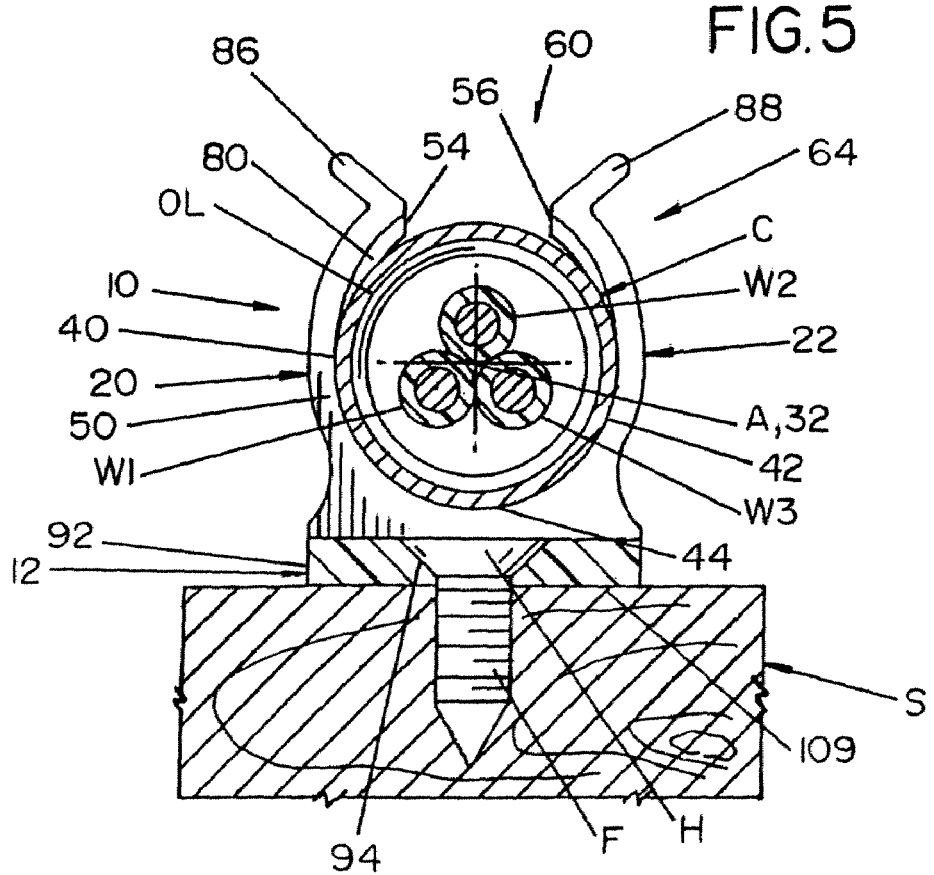
FIG. 5 is a sectional view of the clip shown in FIG. 1 wherein a conduit is secured to the clip and the clip is secured to a wall stud.

Top edges 54 and 56 at least in part form the edges of a top opening 60 sized to allow the conduit to enter cavity 30 with resistance. As can be appreciated, the size of this opening is dependent on the size of the conduit to be inserted. This opening can be a wide range of sizes and in one embodiment, the opening is between 0.23 inches and 0.33 inches and preferable around 0.28 inches when in a relaxed condition 62, as is shown in the several figures including FIG. 4. However, clip 10 is made from a material that can flex such that when the conduit is inserted into cavity 30, edges 54 and 56 will move away from one another based on the insertion force of the conduit which will temporarily enlarge opening 60 and cavity 30. This allows the conduit to be pressed into the clip. Once the conduit is moved through opening 60 and positioned in cavity 30, the clip moves inwardly around the conduit and automatically positions itself into an engaged condition 64, as is shown in FIG. 5 wherein at least a portion of the inner surfaces engage the conduit which will be discussed in greater detail below.

As is discussed above, the conduit can include a central conduit axis A wherein several wires extend generally parallel to this conduit axis. These conduits can be cables that can include three to five wires and as is shown, conduit C includes three wires W1, W2 and W3. Further, these wires can be different gauges. As a result, while many MC cables are standards, there could be different sizes of conduit and, therefore, different clip sizes. Further, the clip can be configured to work in connection with a number of differently sized MC cables and/or conduits which can require greater flexibility in design and/or materials. The wire are maintained within an outer armored layer OL extending about the conduit axis wherein the outer layer is formed from alternating crowns CR and troughs TR that can be helically wound about the conduit axis such that the crowns and troughs are not perpendicular to the conduit axis.

Figure 6:
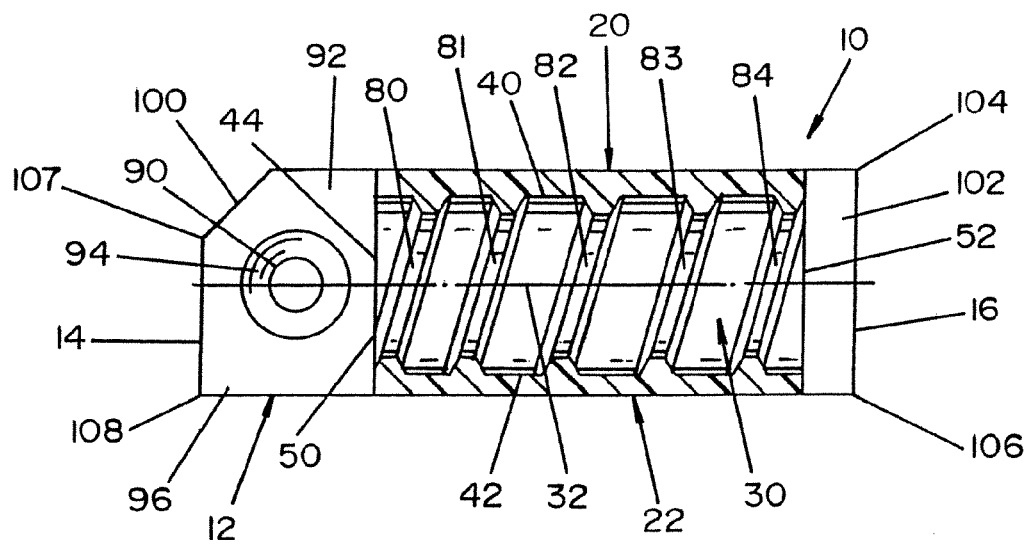
FIG. 6 is a top, partially sectioned, view taken along lines 6-6 in FIG. 3.

In order to meet some building codes, fastening devices, such as the clip of this application, need to secure the conduit such that it can withstand a given pulling load or pull test. In this respect, the clip must withstand an axial pulling load such that the conduit does not slip axial relative to the clip. In order to increase the pulling resistance of the clip, clip 10 can include a rib arrangement on the inner surfaces. In this respect, in one embodiment, clip 10 includes ribs 80-84. However, while five ribs are shown, more or less ribs could be utilized without detracting from the invention of this application. Further, the ribs can have more than one configuration and each rib does not need to be identical. In one embodiment, the ribs extend from near edge 54 to near edge 56 such that the ribs extend about a substantial portion of cavity 30. Further, as is best shown in FIG. 6, ribs 80-84 can have a helical slant that is the same or similar to the helical wrapping of certain cables. In this respect, the ribs can be at an angle to the cavity or conduit axis that is not 90 degrees. As can be appreciated, this configuration allows the ribs to better engage the crowns and troughs of the conduit. As can be also appreciated, the ribs do not need to extend from edge 54 to edge 56. These ribs could be short ribs that engage a small portion of the crown and trough arrangement of the conduit. In one embodiment (not shown), the ribs can be shortened ribs without significant helix wrap.

These ribs secure conduit longitudinally while the C-shape of the clip maintain the conduit axially. As can be appreciated, the use of ribs in the central portion of the clip requires the sides of the C-shaped portion to flex axially outwardly before the conduit can move substantially longitudinally along the conduit axis. This creates significant pull resistance by the clip without the need for complicated and/or difficult to engage mechanisms. In this respect, prior art clips require the end user to use a tool, either a screw driver or a pair of pliers, to properly secure the clip from movement in the longitudinal direction.

As can be appreciated, the longitudinal thickness of the rib or ribs can vary and can influence the desired angle of the rib. In this respect, thicker ribs should be configured more closely to the angle of the recess in the conduit while thinner ribs can have a rib angle that varies more from the actual angle of the recess in MC cables. As can be also appreciated, thinner ribs can also be used for clips designed for differently sized conduits or conduits produced by different manufacturers which have different ranges of tolerance.

The cross-sectional configuration of the ribs can be polygonal, such as the ribs shown or can be other configurations. Again, at least in part, the ribs' cross-sectional configuration is based on the configuration of the recesses in the MC cable. However, other cross-sectional configurations could also be used. As will be discussed in greater detail below, the clip can include in inner surface or surfaces that do not include these ribs.

The clip according to another aspect of the present invention can also include clip-opening flanges 86 and 88 near edges 54 and 56 respectively. These flanges can be used to create a ramp-like effect for the conduit to make it easier to force the conduit into the clip. As is discussed above, it is desirous that that conduit can be positioned in the clip with the use of only one hand. Further, it is also desired that the clip securely engage the conduit. These lead in tapers or clip-opening flanges on the open side of the C-shaped portion allow the clip to be opened by merely pushing the conduit axially against the open side of the C-shaped portion. The conduit will drive the sides of the C-shaped section away from each other until the conduit enters the clip, and then the walls will return toward their natural state. As can be appreciated, the walls may not reach their natural state when they reach the engaged condition which can be used to increase the gripping force on the conduit.

Figure 7:
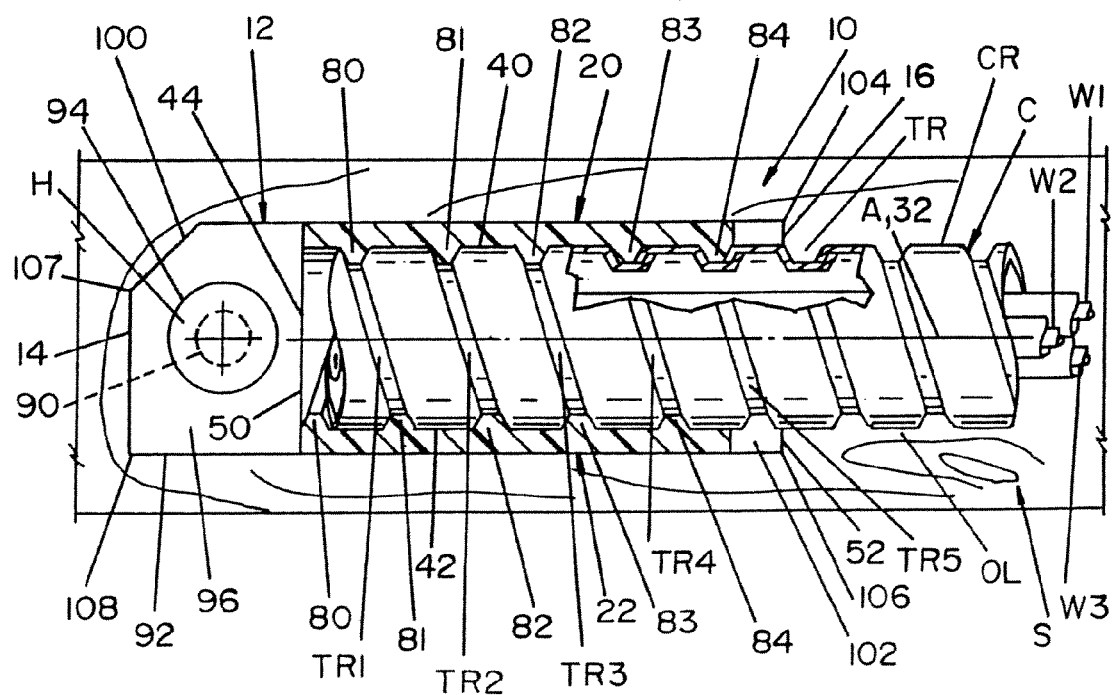
FIG. 7 is a top, partially sectioned, view of the clip shown in FIG. 1 wherein a conduit is secured to the clip and the clip is secured to a wall stud.

With reference to FIG. 7, when the clip is in the engaged condition, the ribs engage the crowns and/or the troughs of the conduit. More particularly, rib 80 is positioned to engage and/or enter at least a portion of trough TR1, rib 81 is positioned to engage and/or enter at least a portion of trough TR2, rib 82 is positioned to engage and/or enter at least a portion of trough TR3, rib 83 is positioned to engage and/or enter at least a portion of trough TR4, and rib 84 is positioned to engage and/or enter at least a portion of trough TR5. As can be appreciated, while the troughs are described as being different troughs, this is for illustrative purposes only in that the troughs of conduit C are typically helically wound such that the trough is a continuous trough. Further, the ribs can be designed to just enter the troughs wherein the inner surfaces 40, 42 and/or 44 engage the crown portion of the conduit. However, clip 10 could be configured to work in connection with any crown and trough arrangement including, but not limited to, independent crown and trough arrangements that are essentially perpendicular to the conduit axis.

With reference to FIGS. 8-11, the clip of this application can be configured to be used in connection with a wide range of mounting arrangements. For example, the clip, according to yet another aspect of the present invention, can utilize any of a number of mounting holes including, but not limited to, a mounting hole 90 on an axially extending flange 92 that is offset from the C-shaped portion of the clip. This mounting hole can be configured to receive any fastener known in the art including, but not limited to, rivets, pop rivets, threaded fasteners and self locking or one-way style fasteners. Further, mounting hole 90 can further include a countersink portion 94 to allow a head H of a fastener F to be flush or below a top surface 96 of flange 92. As is discussed above, the mounting hole and mounting arrangement can also be any mounting arrangement known in the art without detracting from the invention of this application. This can include a self contained clip (not shown) or even multiple fastening arrangements (also not shown). In addition, the mounting hole can be positioned on other components of the clip without detracting from the invention of this application.

Figure 8:
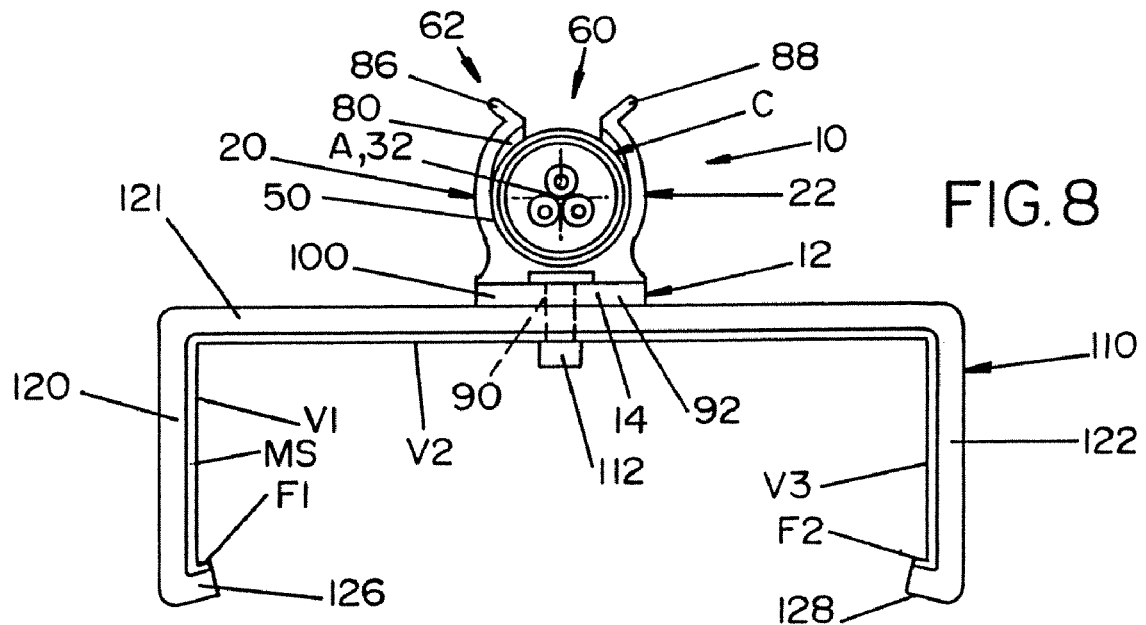
FIG. 8 is a front view of another embodiment of the invention of this application.
Figure 8A:
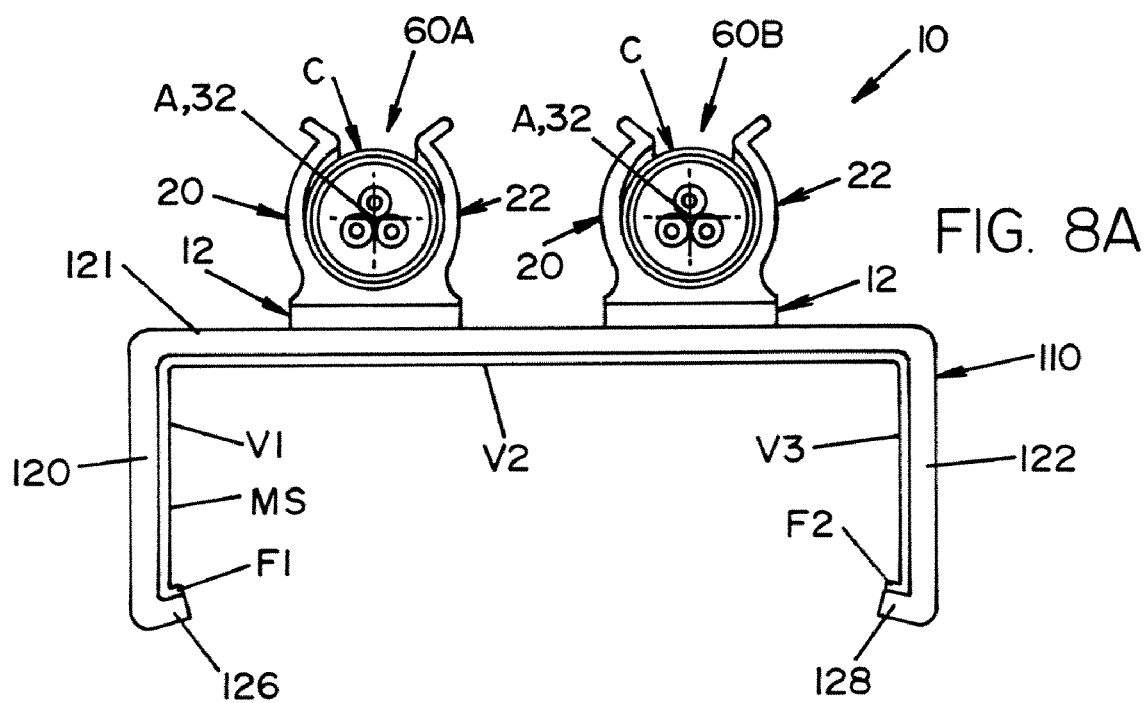
FIG. 8A is a front view of yet another embodiment of the invention of this application with two clips on a single strap.
Figure 9:
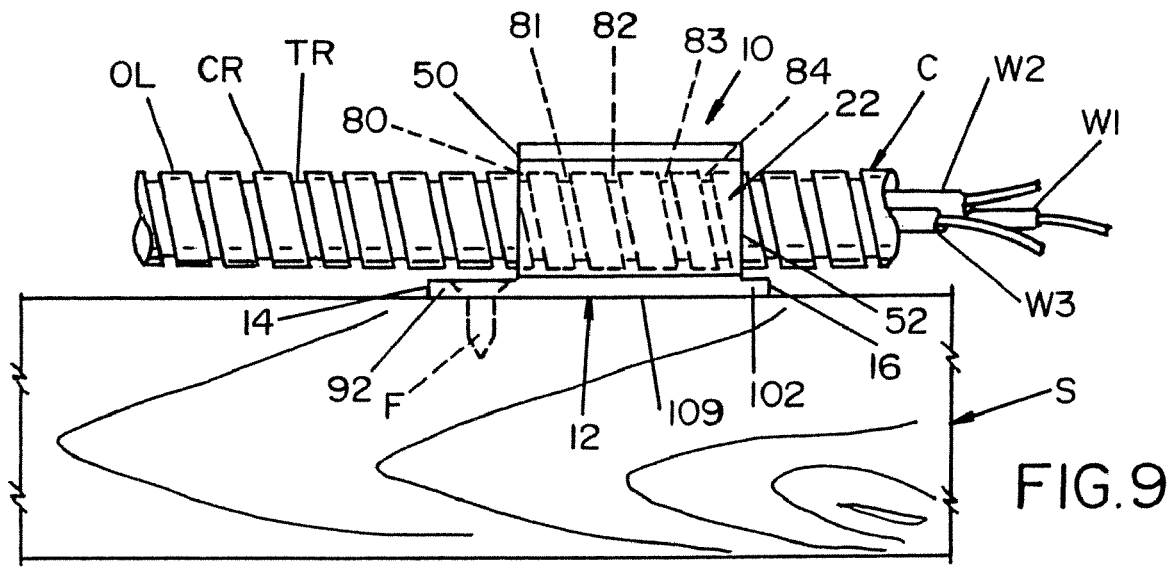
FIG. 9 is a side view of the clip shown in FIG. 8 wherein a conduit is secured to the clip and the clip is secured to a wall stud.

As is shown in FIGS. 8 and 8A, in another embodiment, the clip of this application can be configured to be used in connection with other fastening arrangements, such as a stud strap 110. The clip can be molded to the strap as a unified component (see FIG. 8) or can be attached to the strap with any known fastener in the art (see FIG. 8). This can include, but is not limited to, use of a rivet 112 and/or a one-way locking fastener. This strap arrangement can be contoured and configured to lockingly interengage with a standard 3⅝ inch metal stud MS or other studs known in the art. The strap can also be configured to be fastened to a stud, by any known fasteners in the art. In greater detail, metal stud MS can include vertical members V1, V2 and V3 wherein members V1 and V3 include inward flanges F1 and F2. Stud strap 110 can include Strap sections 120-122 wherein clip 10 can be mounted to the strap portion 121 as is discussed above, such as by mounting hole 90. However, since the clip can be attached to the strap in an offsite operation, mass production techniques could be used to mount the clip to the strap such that other know mounting techniques could be used. As is shown, the clip could be riveted to the strap. Further, in one embodiment, the components can be molded together. The strap can be made from the same material as the clip or can be made from a different material. For example, the strap could be made from steel while the clip is made from a plastic. Strap 110 further includes a mounting arrangement to secure the strap and clip to a structural item of a building structure. This can include locking flanges 126 and 128 that extend inwardly from sections 120 and 122. In operation, the strap is positioned over the stud such that flanges "snaps" over the ends of members V1 and V2 of the stud. However, other mounting arrangements could be used to secure the strap to the stud. If the clip is preassembled onto the strap, simply snapping the strap over the stud can quickly secure clip 10 relative to stud MS.

The strap embodiment of this application can have a number of configurations. As is shown in FIG. 8, the strap can include a single clip mounted to the strap. However, in other embodiments as is shown in FIG. 8A, strap 110 can further include multiple clips on one strap without detracting from the invention of this application. Further, in yet another embodiment, a single strap can be configured to allow one, two, three or even more clips to be secured to a single strap based on the needs of the end user. This can include, but is not limited to, the strap having several spaced holes designed and shaped to receive a self-contained mounting arrangement in the clip or a separate fastener such as those described above, including, but not limited to, rivets. Further, the strap can be designed to be secured on either side of the metal stud.

The strap can be made from any material known in the art. This can include, but is not limited to, a metal or a plastic material, such as a non-destructive polymer plastic with fire retardant qualities having a non toxic burn.

In yet another embodiment, the fastening arrangement for the straps and/or the clip themselves can be configured to allow partial or full rotation of the clip about a desired axis. In this respect, the fastening arrangement used for the clip and/ or the strap can allow the clip to rotate about an axis extending upwardly from the base of clip to allow the clip and the conduit to rotate about an axis transverse to the wire axis. This can provide a clip that is easily rotatable or positionable to allow easy adjustment. Essentially, the rotation is based on the direction that the conduit is being laid and the position of the next clip, and the rotation can be initiated by a tug on the conduit near the next clip. For example, if the conduit is being positioned near a corner or bend in the electrical line, it can be advantageous for the clip, based on the angle the end user pulls on the conduit, to automatically rotate a desired amount while maintaining the conduit securely at the point of attachment to the clip. Further, this rotation can be achieved when the end user is working on the next clip without the need to go back to the previous clip. As is discussed in greater detail above, the ribs within the C-shaped portion prevent the conduit from pulling longitudinally out of the clip during the rotational adjustment of the clip.

In a further embodiment, the rotatable clip could also include a second mounting arrangement including, but not limited to, a second mounting hole (not shown), to lock the clip relative to the stud to prevent rotation after the job is completed. As can be appreciated, this second mounting or securing hole can be spaced from the conduit axis or the clip axis so that it can be accessed when the conduit is in the engaged condition.

Figure 11:
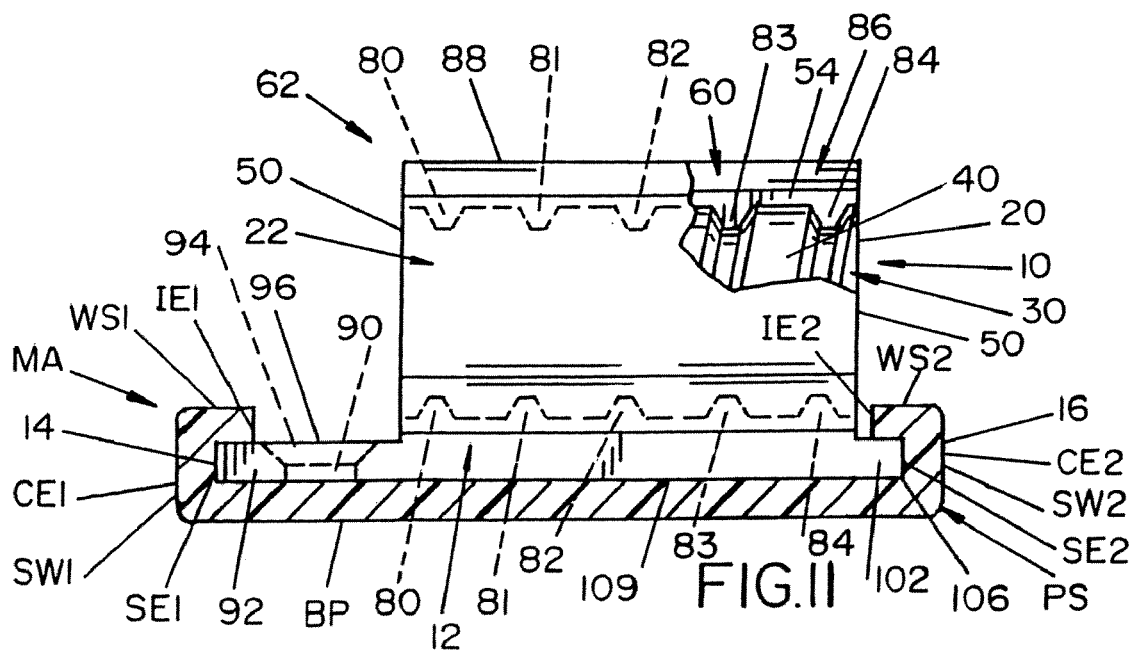
FIG. 11 is a sectional view taken along lines 11-11 in FIG. 10.
Figure 10:
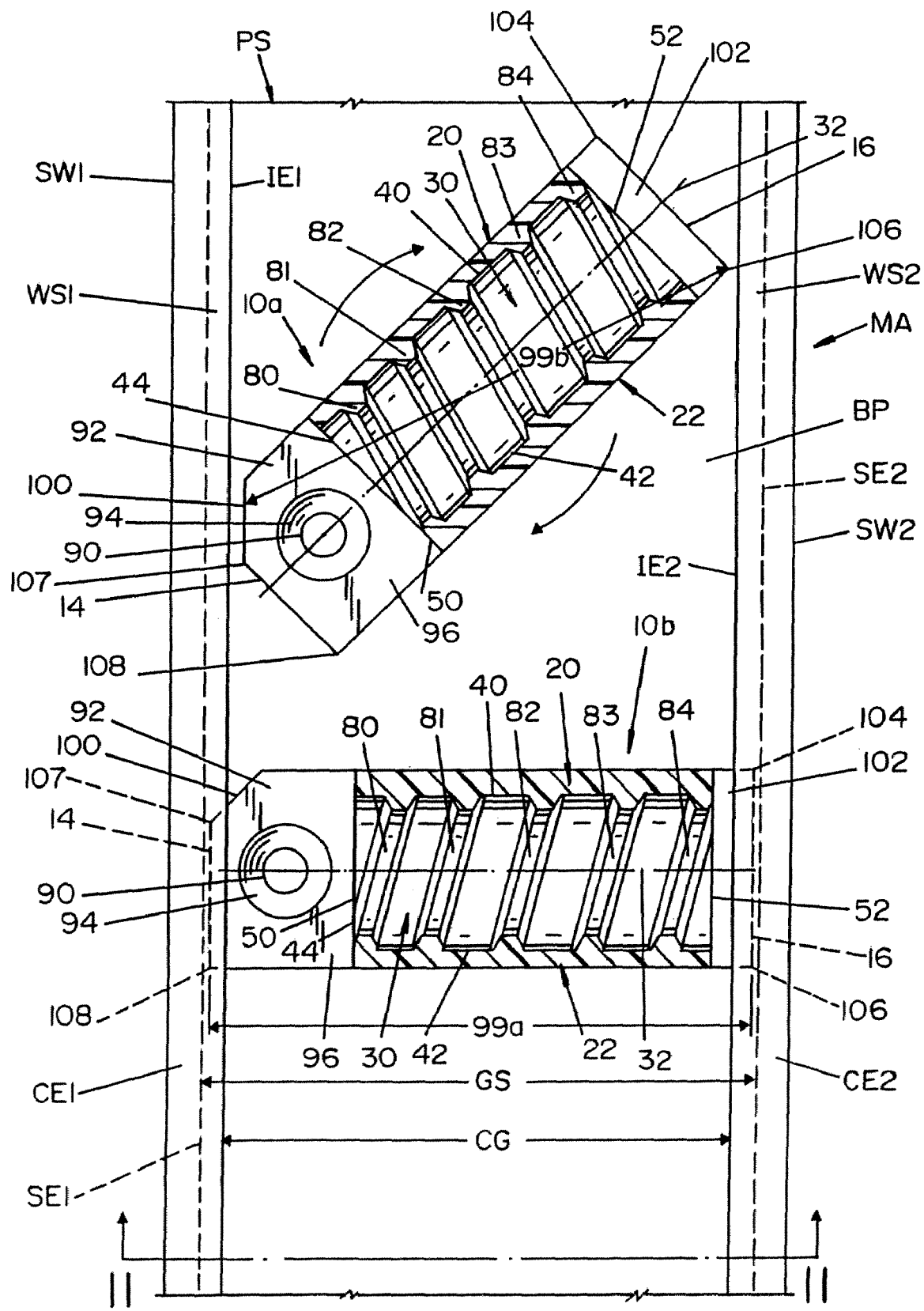
FIG. 10 is a top view of two clips wherein one clip is in position to be secured to a panel strap and the other clip is secured to the panel strap according to another aspect of the present invention.

As is shown in FIGS. 10 and 11, in yet another embodiment, the clip of this application can be configured such that it locks into a panel strap PS. In this respect, shown is a mounting arrangement MA including panel strap PS and clip 10. Panel strap PS can include a base plate BP and opposing channel ends CE1 and CE2 that are spaced from base plate BP thereby forming gaps therebetween shaped to receive the clip. More particularly, panel strap PS includes side walls SW1 and SW2 that extend upwardly from base plate BP side edges SE1 and SE2, respectively. Panel strap PS further includes upper wall sections WS1 and WS2 extending inwardly from side walls SW1 and SW2, respectively, such that side wall SW1 and wall section WS1, together with a portion of base plate BP, form channel end CE1 and side wall SW2 and wall section WS2, together with a portion of base plate BP, form channel end CE2. Channel ends CE1 and CE2 further include inner edges IE1 and IE2, respectively. Inner edges IE1 and IE2 are spaced from one another a distance CG.

Shown in FIG. 10 are clips 10a and 10b which can include a corner cut 100 in flange 92 and a back side flange 102 wherein flanges 92 and 102 have a thickness 97 and 98, respectively, that are less the thickness of these gaps in the channel ends such that the flanges can enter these gaps. In addition, flange 102 can further include flange corners 104 and 106, and flange 92 can further include flange corners 107 and 108. Clip 10 has a length 99a that, in one embodiment, is greater than a gap spacing GS between side walls SW1 and SW2 which will be discussed in greater detail below. Clip 10 can further include a cattycorner length 99b between corner cut 100 and corner 106 that can be, in one embodiment, less than channel gap CG. This configuration allows the clip to be twisted into panel strap PS which will be discussed in greater detail below.

With reference to clip 10a, the clip can be oriented such that corner 106 is positioned in or near channel end CE2 wherein corner cut 100 of flange 92 is adjacent to inner edge IE1 to allow flange 92 to clear channel end CE1. As corner cut 100 clears channel end CE1, a clip bottom surface 109 can be urged against base plate BP. Once in this position, clip 10a can then be twisted clockwise relative to panel strap PS until flanges 92 and 102 snap into channels CE1 and CE2, respectively, as is shown with clip 10b. More particularly, as the clip is twisted, corner 107 of flange 92 and corner 106 of flange 102 engage side walls SW1 and SW2, respectively, such that the clips snaps into engagement with the channels and the clip is held in place relative to the strap. As is discussed in this application, the clips of this application can be used for a wide range of conduits and sizes of conduits including a variety of electrical and even a variety of non-electrical conduits. Accordingly, and as can be appreciated, more than one type and/or size of clip can be used with a single size of panel strap. This allows a single panel strap to be connected to a structural portion, such as a stud, and a range of clips to be attached to this single strap.

In yet another embodiment, the clip can be configured such that another portion of the clip, such as edge 52, engages channel edge IE2 to create the engagement between the clip and the panel strap. In even yet another embodiment, the clip and the panel strap can be configured to produce a resistance fit between the clip and the panel strap such that the clip cannot be easily moved relative to the strap once it is snapped into place. In a further embodiment, the channels of the strap can have non-parallel portions. In this respect, channels CE1 and CE2 can include a downwardly extending portion such as a downwardly extending channel end to engage the clip.

As can be appreciated, clips 10a and/or 10b could also be reversed such that they are oriented with flanges 92 and 102 locked into channels CE2 and CE1, respectively. Once locked in place, clip 10 can be secured relative to the panel strap. By utilizing panel strap PS, one or even several clips can be quickly positioned and secured at a given location such as near an electrical panel (not shown).

In even yet another embodiment, the configuration of the clips according to the present invention can also be modified to matingly engage with mounting devices known in the industry or mounting devices which will be used in the industry.

Figure 12:
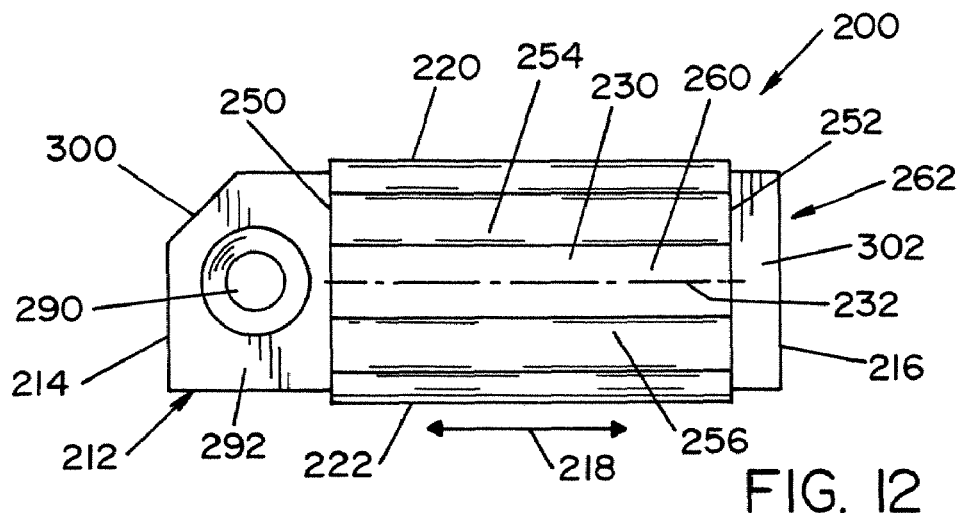
FIG. 12 is a top view of another embodiment of a clip in accordance with another aspect of the present invention.
Figure 13:
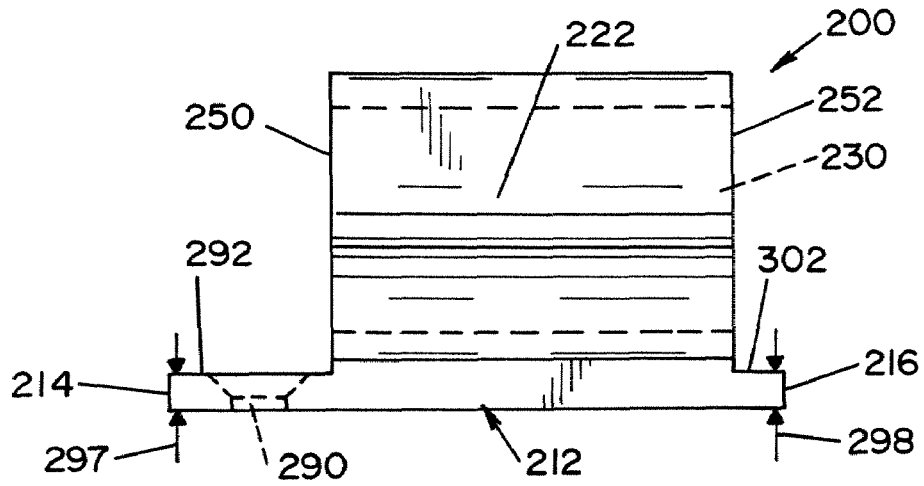
FIG. 13 is a side view of the clip shown in FIG. 12.
Figure 14:
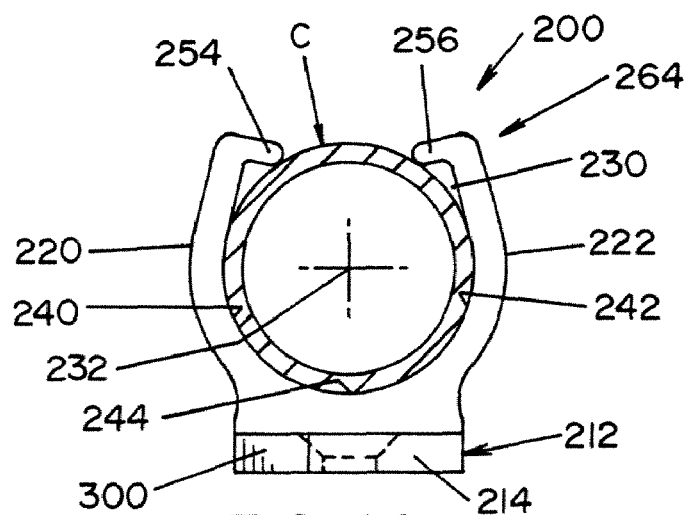
FIG. 14 is a front view of the clip shown in FIG. 12.

With reference to FIGS. 12-14, shown is yet another embodiment of the invention of this application. In this respect, shown a clip 200 having a base portion 212 extending between an end 214 and an end 216 that together define longitudinal direction 218. Clip 200 further includes side walls 220 and 222 that also extend in the longitudinal direction.

Clip 200 further includes a conduit receiving cavity 230 that is oval or C-shaped which can extend from end 214 to end 216, but can be shorter. Cavity 230 is shaped to receive a section of an armored conduit or MC-cable C to secure conduit C to the clip such that the clip can be used to support the conduit on a structural object such as on stud S. Cavity 230 extends circumferentially about a cavity axis 232. Cavity 230 is formed at least in part by inner surfaces 240 and 242 of walls 220 and 222, respectively. As with other embodiments, inner surface portions 240 & 242 can be joined to one another or can be connected by a base surface portion 244 near base 212. Further, cavity 230 can be a smooth arcuate cavity or can be polygonal such that it is still generally C-shaped. As can be appreciated, and for example only, surface portion 240 or 242 could be formed by a plurality of non-parallel flat surface portions producing a polygonal cross-sectional configuration or could be formed by a unified arcuate surface without detracting from the invention of this application.

Again, cavity 230 extends longitudinally in direction 218 and is shown to extend between cavity ends 250 and 252. Cavity 230 extends circumferentially between top inwardly facing barbs 254 and 256. While cavity 230 is shown to be continuous, cavity 230 does not need to be continuous and could include gaps, mounting arrangements etc. including, but not limited to, a central mounting hole (not shown) in the cavity to secure the clip to a structural object which will be discussed in greater detail below.

Barbs 254 and 256 can at least in part form the edges of a top opening 260 sized to allow the conduit to enter cavity 230 with resistance. As can be appreciated, the size of this opening is dependent on the size of the conduit to be inserted. This opening can be a wide range of sizes and in one embodiment, the opening that is sized based on the size of the conduit to be secured when in a relaxed condition 262. However, clip 200 is made from a material that can flex such that when the conduit is inserted into cavity 230, barbs 254 and 256 move away from one another based on the insertion force of the conduit which will temporarily enlarge opening 260 and cavity 230. This allows the conduit to be pressed into the clip. Once the conduit is moved through opening 260 and positioned in cavity 230, the clip moves inwardly around the conduit and automatically positions itself into an engaged condition 264, as is shown in FIG. 14 wherein at least a portion of the inner surfaces engage the conduit which will be discussed in greater detail below.

As with the other embodiments, clip 200 can be configured to be used in connection with a wide range of mounting arrangements. In this respect, clip 200 can utilize any of a number of mounting holes including, but not limited to, a mounting hole 290 on an axially extending flange 292 that is offset from the C-shaped portion of the clip. This mounting hole can also be configured to receive any fastener known in the art including, but not limited to, rivets, pop rivets, threaded fasteners and self locking or one-way style fasteners. Further, mounting hole 290 can have a countersunk portion. This can include further include any other mounting arrangement discussed in this application. This includes, but is not limited to, being configured to be used in connection with stud straps 110 as are discussed above. Clip 200 can also be configured to allow partial or full rotation of the clip about a desired axis as is discussed above. Yet even further, clip can be used in combination with panel strap PS discussed above. In this respect, clip 200 can further include a corner cut 300 in flange 292 and a back side flange 302 wherein flanges 292 and 302 have a thickness 297 and 298, respectively, that are less the thickness of the gaps in the channel ends such that the flanges can enter these gaps. As is discussed in greater detail above, this configuration can be used to lockingly secure clip 200 to panel strap PS.

In even yet another embodiment, the configuration of the clips according to the present invention can also be modified to matingly engage with mounting devices known in the industry or mounting devices which will be used in the industry.

The clip of this application can have many configurations or modification without detracting from the invention of this application. For example, the flanges, such as flange 92, can have many different configurations including the four sided polygonal configuration described with respect to one of the embodiments above, a rectangular configuration, a semi-circular configuration or even combinations thereof. As discussed above, these configurations can be used for a mounting hole, such as mounting hole 90, and/or can be used for the mating engagement with other object such as the use of flanges 92 and 102 to engage a panel strap. Further, this configuration can be based on manufacturing techniques to simplify the manufacturing process such as configurations that allow the clip to be extruded.

The material used for the clip can be any known material in the art including, but not limited to, a plastic clip material that is flexible with memory such as a non destructive polymer plastic with fire retardant qualities that is non toxic.

While considerable emphasis has been placed on the preferred embodiments of the invention illustrated and described herein, it will be appreciated that other embodiments and/or equivalents thereof can be made and that many changes can be made in the preferred embodiments without departing from the principals of the invention. Accordingly, it is to be distinctly understood that the foregoing descriptive matter is to be interpreted merely as illustrative of the invention and not as a limitation.

Having thus described the invention, is so claimed:

1. A clip for securing a conduit to a structural object, the conduit having a central conduit axis and an outer layer extending about the conduit axis, said clip comprising a clip body having a longitudinally extending base extending between a front edge and a back edge, with side edges extending between said front and back edges, said base further having a base thickness, said clip further including a first side wall extending upwardly from said base between said front and back edges, said first side wall having a first inwardly extending surface forming a first portion of a longitudinally extending conduit cavity, said first portion having a first upper edge; a second side wall extending upwardly from said base between said front and back edges, said second side wall having a second inwardly extending surface forming a second portion of said conduit cavity and defining a cavity width, said second portion facing said first portion and having a second upper edge spaced from said first upper edge thereby forming a longitudinally extending entry gap smaller than said cavity width for receiving and lockingly engaging a conduit, said entry gap being generally opposite to said base; said first and second side walls being bendable between a relaxed condition when the conduit is not positioned in said cavity and an engaged condition when the conduit is positioned in said cavity such that the conduit extends longitudinally through said cavity, said base further including a front flange extending forwardly beyond said first and second side walls and an oppositely facing back flange extending rearwardly beyond said first and second side walls, one of said front and back flanges having a generally rectangular configuration and the other of said front and back flanges having a generally rectangular configuration but including a corner notch.

2. The clip of claim 1, wherein said mounting hole is longitudinally spaced from said cavity such that said conduit covers said mounting hole when the conduit is positioned in said cavity.

3. A clip for securing a conduit to a structural object, the conduit having a central conduit axis and an outer layer extending about the conduit axis, said clip comprising a clip body having a longitudinally extending base extending between a front edge and a back edge, with side edges extending between said front and back edges, said base further having a base thickness, said clip further including a first side wall extending upwardly from said base between said front and back edges, said first side wall having a first inwardly extending surface forming a first portion of a longitudinally extending conduit cavity, said first portion having a first upper edge; a second side wall extending upwardly from said base between said front and back edges, said second side wall having a second inwardly extending surface forming a second portion of said conduit cavity, said second portion facing said first portion and having a second upper edge spaced from said first upper edge thereby forming a longitudinally extending entry gap for receiving a conduit, said entry gap being generally opposite to said base; said first and second side walls being bendable between a relaxed condition when the conduit is not positioned in said cavity and an engaged condition when the conduit is positioned in said cavity such that the conduit extends longitudinally through said cavity, said base further including a front flange extending forwardly beyond said first and second side walls and an oppositely facing back flange extending rearwardly beyond said first and second side walls, one of said front and back flanges having a generally rectangular configuration and the other of said front and back flanges having a generally rectangular configuration but including a corner notch, said corner notch is a flat notch.

4. The clip of claim 3, wherein said notch is generally at a 45 degree angle to said longitudinal direction.

5. A clip for securing a conduit to a structural object, the conduit having a central conduit axis and an outer layer extending about the conduit axis, said clip comprising a clip body having a longitudinally extending base extending between a front edge and a back edge, with side edges extending between said front and back edges, said base further having a base thickness, said clip further including a first side wall extending upwardly from said base between said front and back edges, said first side wall having a first inwardly extending surface forming a first portion of a longitudinally extending conduit cavity, said first portion having a first upper edge; a second side wall extending upwardly from said base between said front and back edges, said second side wall having a second inwardly extending surface forming a second portion of said conduit cavity, said second portion facing said first portion and having a second upper edge spaced from said first upper edge thereby forming a longitudinally extending entry gap for receiving a conduit, said entry gap being generally opposite to said base; said first and second side walls being bendable between a relaxed condition when the conduit is not positioned in said cavity and an engaged condition when the conduit is positioned in said cavity such that the conduit extends longitudinally through said cavity, said base further including a front flange extending forwardly beyond said first and second side walls and an oppositely facing back flange extending rearwardly beyond said first and second side walls, one of said front and back flanges having a generally rectangular configuration and the other of said front and back flanges having a generally rectangular configuration but including a corner notch, said notch is generally at a 45 degree angle to said longitudinal direction.

6. A clip for securing a conduit to a structural object, the conduit having a central conduit axis and an outer layer extending about the conduit axis, said clip comprising a clip body having a longitudinally extending base extending between a front edge and a back edge, with side edges extending between said front and back edges, said base further having a base thickness, said clip further including a first side wall extending upwardly from said base between said front and back edges, said first side wall having a first inwardly extending surface forming a first portion of a longitudinally extending conduit cavity, said first portion having a first upper edge; a second side wall extending upwardly from said base between said front and back edges, said second side wall having a second inwardly extending surface forming a second portion of said conduit cavity, said second portion facing said first portion and having a second upper edge spaced from said first upper edge thereby forming a longitudinally extending entry gap for receiving a conduit, said entry gap being generally opposite to said base; said first and second side walls being bendable between a relaxed condition when the conduit is not positioned in said cavity and an engaged condition when the conduit is positioned in said cavity such that the conduit extends longitudinally through said cavity, said base further including a front flange extending forwardly beyond said first and second side walls and an oppositely facing back flange extending rearwardly beyond said first and second side walls, one of said front and back flanges having a generally rectangular configuration and the other of said front and back flanges having a generally rectangular configuration but including a corner notch, said other flange further includes a mounting hole spaced from said notch.

7. A clip for securing a conduit to a structural object, the conduit having a central conduit axis and an outer layer extending about the conduit axis, said clip comprising a clip body having a longitudinally extending base extending between a front edge and a back edge, with side edges extending between said front and back edges, said base further having a base thickness, said clip further including a first side wall extending upwardly from said base between said front and back edges, said first side wall having a first inwardly extending surface forming a first portion of a longitudinally extending conduit cavity, said first portion having a first upper edge; a second side wall extending upwardly from said base between said front and back edges, said second side wall having a second inwardly extending surface forming a second portion of said conduit cavity, said second portion facing said first portion and having a second upper edge spaced from said first upper edge thereby forming a longitudinally extending entry gap for receiving a conduit, said entry gap being generally opposite to said base; said first and second side walls being bendable between a relaxed condition when the conduit is not positioned in said cavity and an engaged condition when the conduit is positioned in said cavity such that the conduit extends longitudinally through said cavity, said base further including a front flange extending forwardly beyond said first and second side walls and an oppositely facing back flange extending rearwardly beyond said first and second side walls, one of said front and back flanges having a generally rectangular configuration and the other of said front and back flanges having a generally rectangular configuration but including a corner notch, said first and second walls further include inwardly extending barbs defining said longitudinal opening.

8. A clip for securing a conduit to a structural object, the conduit having a central conduit axis and an outer layer extending about the conduit axis, said clip comprising a clip body having a longitudinally extending base extending between a front edge and a back edge, with side edges extending between said front and back edges, said base further having a base thickness, said clip further including a first side wall extending upwardly from said base between said front and back edges, said first side wall having a first inwardly extending surface forming a first portion of a longitudinally extending conduit cavity, said first portion having a first upper edge; a second side wall extending upwardly from said base between said front and back edges, said second side wall having a second inwardly extending surface forming a second portion of said conduit cavity, said second portion facing said first portion and having a second upper edge spaced from said first upper edge thereby forming a longitudinally extending entry gap for receiving a conduit, said entry gap being generally opposite to said base; said first and second side walls being bendable between a relaxed condition when the conduit is not positioned in said cavity and an engaged condition when the conduit is positioned in said cavity such that the conduit extends longitudinally through said cavity, said base further including a front flange extending forwardly beyond said first and second side walls and an oppositely facing back flange extending rearwardly beyond said first and second side walls, one of said front and back flanges having a generally rectangular configuration and the other of said front and back flanges having a generally rectangular configuration but including a corner notch, said clip further including at least one generally transverse rib in said cavity.

9. The clip of claim 8, wherein said at least one transverse rib extends from near said first upper edge to near said second upper edge.

10. The clip of claim 8, wherein said at least one transverse rib extends helically about the conduit axis.

11. The clip of claim 8, wherein said at least one transverse rib is at least three parallel ribs.

12. A clip for securing a conduit to a structural object, the conduit having a central conduit axis and an outer layer extending about the conduit axis, said clip comprising a clip body having a longitudinally extending base extending between a front edge and a back edge, with side edges extending between said front and back edges, said base further having a base thickness, said clip further including a first side wall extending upwardly from said base between said front and back edges, said first side wall having a first inwardly extending surface forming a first portion of a longitudinally extending conduit cavity, said first portion having a first upper edge; a second side wall extending upwardly from said base between said front and back edges, said second side wall having a second inwardly extending surface forming a second portion of said conduit cavity, said second portion facing said first portion and having a second upper edge spaced from said first upper edge thereby forming a longitudinally extending entry gap for receiving a conduit, said entry gap being generally opposite to said base; said first and second side walls being bendable between a relaxed condition when the conduit is not positioned in said cavity and an engaged condition when the conduit is positioned in said cavity such that the conduit extends longitudinally through said cavity, said base further including a front flange extending forwardly beyond said first and second side walls and an oppositely facing back flange extending rearwardly beyond said first and second side walls, one of said front and back flanges having a generally rectangular configuration and the other of said front and back flanges having a generally rectangular configuration but including a corner notch, said first surface portion and said second surface portion are arcuate and said conduit cavity is a substantially arcuate.

13. A mounting arrangement for securing a conduit to a structural object, the conduit having a central conduit axis and an outer layer extending about the conduit axis, said mounting arrangement comprising a clip including a longitudinally extending clip body extending between a first and a second end thereby defining a clip length, said clip including a conduit receiving cavity extending about a cavity axis such that said cavity includes a conduit receiving slot parallel to said cavity axis, said clip further including a first longitudinally extending flange at said first end and a second longitudinally extending flange at said second end, said first flange having a first transverse outer edge at least partially defining said first end and said second flange having a second transverse edge at least partially defining said second end, said first flange further including a first corner portion and a second corner portion, said second flange including a third corner portion and a forth corner portion such that said first corner portion is cattycornered to said third corner portion defining a clearance length of said clip and said second corner portion is cattycornered to said forth corner portion defining a locking length of said clip, said clearance length being less than said locking length; said mounting arrangement further including a panel strap securable to a structural object, said strap including a base plate and inwardly extending first and second side channels each shaped to receive a portion of one said flange, said each channel including inner edges facing one another thereby defining a clip receiving gap, said each channel further including side walls spaced from one another by an end wall spacing, said clearance length being less than said end wall spacing such that said clip can be received in said clip receiving gap and said locking length being greater than said end wall spacing wherein said clip can be rotated relative to said strap to substantially lock said clip relative to said strap.

14. The mounting arrangement of claim 13, wherein said clip body further includes first and second side walls at least partially forming said conduit receiving cavity, said first side wall extending upwardly from a clip base between said first and second ends, said first side wall having a first inwardly extending surface forming a first portion of said conduit cavity, said first portion having a first upper edge; said second side wall extending upwardly from said base between said first and second ends, said second side wall having a second inwardly extending surface forming a second portion of said conduit cavity, said second portion facing said first portion and having a second upper edge spaced from said first upper edge thereby forming a longitudinally extending entry gap for receiving a conduit, said entry gap being generally opposite to said base; said first and second side walls being bendable between a relaxed condition when the conduit is not positioned in said cavity and an engaged condition when the conduit is positioned in said cavity such that the conduit extends longitudinally through said cavity.

15. The mounting arrangement of claim 14, wherein said first longitudinally extending flange extends beyond said first and second side walls and said second longitudinally extending flange extends oppositely from said first flange and beyond said first and second side walls.

16. The mounting arrangement of claim 14, wherein said first and second walls further include inwardly extending barbs defining said longitudinal opening.

17. The mounting arrangement of claim 14, wherein said first surface portion and said second surface portion are arcuate and said conduit cavity is a substantially arcuate.

18. The mounting arrangement of claim 13, wherein one of said first and second corner portions includes a notch thereby producing said clearance length.

19. The mounting arrangement of claim 18, wherein said notch is a flat notch.

20. The mounting arrangement of claim 19, wherein said notch is generally at a 45 degree angle to said longitudinal direction.

21. The mounting arrangement of claim 18, wherein said notch is generally at a 45 degree angle to said longitudinal direction.

22. The mounting arrangement of claim 13, wherein one of said first and second longitudinally extending flanges includes a mounting hole.

23. The mounting arrangement of claim 13, further including at least one generally transverse rib in said cavity.

24. The mounting arrangement of claim 23, wherein said at least one transverse rib extends from near said first upper edge to near said second upper edge.

25. The mounting arrangement of claim 23, wherein said at least one transverse rib extends helically about the conduit axis.

26. The mounting arrangement of claim 23, wherein said at least one transverse rib is at least three parallel ribs.

27. A mounting arrangement for securing a conduit to an associated stud in a building structure wherein said stud includes a front, rear and side structural surface, the conduit having a central conduit axis and an outer layer extending about the conduit axis, said mounting arrangement comprising a clip including a longitudinally extending clip body extending between a first and a second end thereby defining a clip length, said clip including a conduit receiving cavity extending about a cavity axis such that said cavity includes a conduit receiving slot parallel to said cavity axis; said mounting arrangement further including a strap joined to said clip, said strap including a base plate extending in a base plane direction between a first end and a second end and having an outer surface and an inner surface, said clip being joined to said base plate on said outer surface, said strap further including a first planar leg extending from said first end and a second planar leg extending from said second end wherein said base plate and said first and second legs form generally a C-shaped strap, said first and second legs including outer and inner surfaces with distal ends spaced from said base plate, respectively, each said distal end including a barb, said each barb extending inwardly and upwardly toward said clip, said inner surfaces of said legs and said inner surface of said base plate engaging said stud and said barbs interengaging with said stud to maintain said mounting arrangement relative to said stud, said outer surfaces of said legs being smooth to allowing the clip and said associated stud to be covered by another associated structural object.

28. The mounting arrangement of claim 27, wherein said clip and said strap are a single molded component.

29. The mounting arrangement of claim 27, wherein the associated stud is to be covered by a wall board, the associated stud having a rectangular cross-sectional configuration with a short side and a long side, said strap being configured to interengage with the associated stud such that said base plate is generally parallel to the long side and said legs overlap the short sides, said barbs engaging the associated stud to at least in part for said interengagement.

30. The mounting arrangement of claim 29, wherein the associated stud extends along an associated stud axis, said cavity axis extending generally parallel to the associated stud axis.

31. The mounting arrangement of claim 29, wherein said clip is a first clip and said arrangement further includes a second clip, said first and second clips being positioned on said base plate.

32. The mounting arrangement of claim 29, wherein said clip and said strap are a single molded component.

33. The mounting arrangement of claim 32, wherein said clip is a first clip and said arrangement further includes a second clip, said first and second clips being positioned on said base plate.

34. The mounting arrangement of claim 32, wherein the other associated object is an associated wall board mounted to said stud, said legs having an overall thickness sufficiently small to prevent noticeable bulging of the wall board.

35. A mounting arrangement for securing a conduit to an elongated structural object having a front, rear and side structural surface, the conduit having a central conduit axis and an outer layer extending about the conduit axis, said mounting arrangement comprising a clip including a longitudinally extending clip body extending between a first and a second end thereby defining a clip length, said clip including a conduit receiving cavity extending about a cavity axis such that said cavity includes a conduit receiving slot parallel to said cavity axis; said mounting arrangement further including a strap joined to said clip, said strap including a base plate extending in a base plane direction between a first end and a second end and having an outer surface and an inner surface, said clip being joined to said base plate on said outer surface, said strap further including a first planar leg extending from said first end and a second planar leg extending from said second end wherein said base plate and said first and second legs form generally a C-shaped strap, said first and second legs including outer and inner surfaces with distal ends spaced from said base plate, respectively, which include inwardly extending barbs, said inner surfaces of said legs and said inner surface of said base plate engaging the surfaces of an associated elongated structural object and said barbs interengaging with said object to maintain said mounting arrangement relative to said object, said outer surfaces of said legs being smooth to allowing the clip and the associated object to be covered by another associated structural object, said clip is a first clip and said arrangement further includes a second clip, said first and second clips being positioned on said base plate side-by-side one another.

36. The mounting arrangement of claim 35, wherein said barbs extend inwardly and upwardly toward said clip.

\* \* \* \* \*